(12) United States Patent
Hansen et al.

(10) Patent No.: US 8,399,841 B2
(45) Date of Patent: Mar. 19, 2013

(54) DIGITAL RADIOGRAPHIC DETECTOR WITH BONDED PHOSPHOR LAYER

(75) Inventors: Marcia K. Hansen, Fairport, NY (US); Andrea M. Ainsworth, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 153 days.

(21) Appl. No.: 12/632,023

(22) Filed: Dec. 7, 2009
(Under 37 CFR 1.47)

(65) Prior Publication Data
US 2011/0133092 A1    Jun. 9, 2011

(51) Int. Cl.
*G01T 1/20* (2006.01)
(52) U.S. Cl. .................................................. 250/366
(58) Field of Classification Search .................. 250/366
See application file for complete search history.

(56) References Cited

U.S. PATENT DOCUMENTS

| | | | |
|---|---|---|---|
| 3,389,030 A * | 6/1968 | Mepham | 156/67 |
| 3,725,704 A * | 4/1973 | Buchanan et al. | 250/483.1 |
| 4,288,264 A | 9/1981 | Haque | |
| 4,689,487 A * | 8/1987 | Nishiki et al. | 250/361 R |
| 5,506,409 A | 4/1996 | Yoshida et al. | |
| 6,583,419 B1 | 6/2003 | Moy et al. | |
| 6,583,434 B2 * | 6/2003 | Struye et al. | 250/581 |
| 6,770,885 B2 | 8/2004 | Eberhard et al. | |
| 6,847,041 B2 * | 1/2005 | Okada et al. | 250/370.11 |
| 7,368,718 B2 | 5/2008 | Freund et al. | |
| 7,547,895 B2 * | 6/2009 | Manivannan et al. | 250/483.1 |
| 7,576,336 B2 | 8/2009 | Shoji | |
| 7,692,156 B1 * | 4/2010 | Nagarkar | 250/370.11 |
| 2007/0290135 A1 | 12/2007 | Manivannan et al. | |
| 2008/0206917 A1 | 8/2008 | Dast | |
| 2009/0101844 A1 * | 4/2009 | Ohbayashi | 250/488.1 |
| 2009/0261259 A1 | 10/2009 | Yip et al. | |

FOREIGN PATENT DOCUMENTS

JP         55161245         12/1980

* cited by examiner

*Primary Examiner* — Christine Sung (57) ABSTRACT

A digital radiographic detector has a scintillator element having a particulate phosphor dispersed within a binder composition, wherein the binder composition is a pressure-sensitive adhesive, wherein the particulate phosphor emits light corresponding to a level of incident radiation. There is an array of photosensors wherein each photosensor in the array is energizable to provide an output signal indicative of the level of emitted light that is received. The scintillator element bonds directly to, and in optical contact with, either the array of photosensors or an array of optical fibers that guide light to the array of photosensors.

20 Claims, 9 Drawing Sheets

(Prior Art)

FIG. 3B

(Prior Art)

FIG. 3C

(Prior Art)

FIG. 3D

(Prior Art)

FIG. 3E

(Prior Art)

FIG. 3F

(Prior Art)

| | | Binder in Phosphor Layer | Protective Layer Thickness (um) | Adhesive Layer Thickness (um) | Screen Contact Method | Optically Coupled? | Limiting Resolution (lp/mm) | Relative Detector Response |
|---|---|---|---|---|---|---|---|---|
| "A" | comp | typical | 0 | 0 | pressure | no | 12 | 1.00 |
| "B" | comp | typical | 13 | 0 | pressure | no | 12 | 1.01 |
| "C" | comp | typical | 0 | 20 | adhesion | yes | 12 | 0.75 |
| "D" | comp | typical | 13 | 20 | adhesion | yes | 11 | 0.77 |
| "E" | inv | adhesive | 0 | 0 | adhesion | yes | 15 | 0.71 |

DIGITAL RADIOGRAPHIC DETECTOR WITH BONDED PHOSPHOR LAYER

FIELD OF THE INVENTION

The invention relates generally to the field of digital radiography and more particularly relates to an improved digital radiographic detector with a scintillator layer coupled to a photosensor array.

BACKGROUND OF THE INVENTION

Systems for acquiring radiographic images are widely used in medical and dental care. Due to recent advances in component miniaturization, data transmission and processing speed, and with improved image processing and display capabilities, apparatus and methods for obtaining radiographic images directly in digital format are increasingly being used. With digital radiography, the radiation image exposures captured on radiation-sensitive phosphor layers are converted, pixel by pixel, to electronic image data which is then stored in memory circuitry for subsequent read-out and display on suitable electronic image display devices.

In typical digital radiography of the indirect type, a phosphor layer converts incident x-rays to visible light, which is then detected by a photosensor array that converts light intensity information to a corresponding electronic image signal. An intermediary fiber optic element may be used to channel the light from the phosphor layer to the photosensor array.

Figure 1:
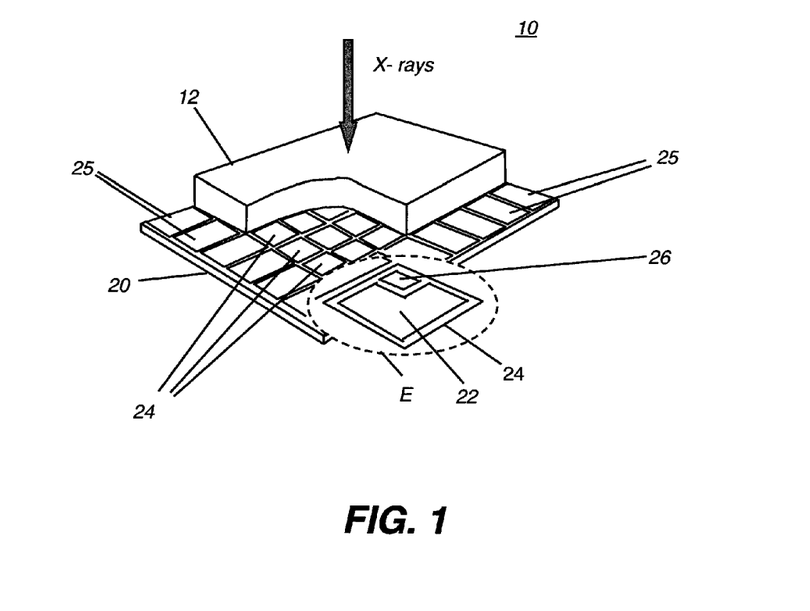
FIG. 1 is a perspective, partial cutaway view showing a small portion of a digital radiography detector device.

The perspective view of FIG. 1 shows a partial cutaway view of a small edge portion of a digital radiography (DR) detector 10 of the indirect type. A phosphor layer 12, formed from scintillating materials, responds to incident x-ray radiation by generating visible light that is, in turn, detected by a detector array 20. An optional fiber optic array can be provided for directing light from phosphor layer 12 toward detector array 20. Detector array 20 has a two-dimensional array having many thousands of radiation sensitive pixels 24 that are arranged in a matrix of rows and columns and are connected to a readout element 25. As shown at enlarged section E, each pixel 24 has one or more photosensors 22 and includes an associated switch element 26 of some type. To read out image information from the panel, each row of pixels 24 is selected sequentially and the corresponding pixel in each column is connected in its turn to a charge amplifier (not shown). The outputs of the charge amplifiers from each column are then applied to other circuitry that generates digitized image data that can then be stored and suitably processed as needed for subsequent storage and display.

Indirect DR imaging, using components arranged as in FIG. 1, shows promise for providing improved diagnostic imaging performance with high levels of image quality. However, some drawbacks remain. Because scintillating phosphor layer materials respond to incident x-ray radiation by emitting light over a broad range of angles, there is some inherent amount of scattering in the indirect detection process. Image sharpness is degraded when the visible light emitted from the phosphor is allowed to spread from its point of origin. The farther the emitted light spreads before detection by the photosensor, the greater the loss of light and sharpness. Any type of gap between the phosphor layer and its corresponding photodetector array can allow light to spread and consequent loss of image quality. For this reason, it can be particularly important to place the phosphor layer 12 (FIG. 1) as close to the photodetector (detector array 20) as possible.

In addition to losses from spreading and scattering, some further loss of light can occur due to reflection, such as where the light traverses an interface to a material with lower refractive index. Reflected light returning toward the phosphor layer may be reflected again by the phosphor and can travel to the photosensor in a position that is even farther from its point of origin, thus further degrading the sharpness of the image. This type of effect reduces the overall optical efficiency of image formation due to loss of light, signal crosstalk, and related effects, and tends to degrade image quality.

Phosphor layers used to convert x-rays to visible light in radiography are typically prepared by one of two methods. One method is to mix particles of phosphor with a binder and form this mixture into a sheet, usually by coating the mixture onto a carrier film. Another method is to evaporate phosphor onto a sheet substrate, forming needle-like structures. In both methods, the phosphor layer is covered with a protective coating to prevent physical and chemical damage.

Figure 2:
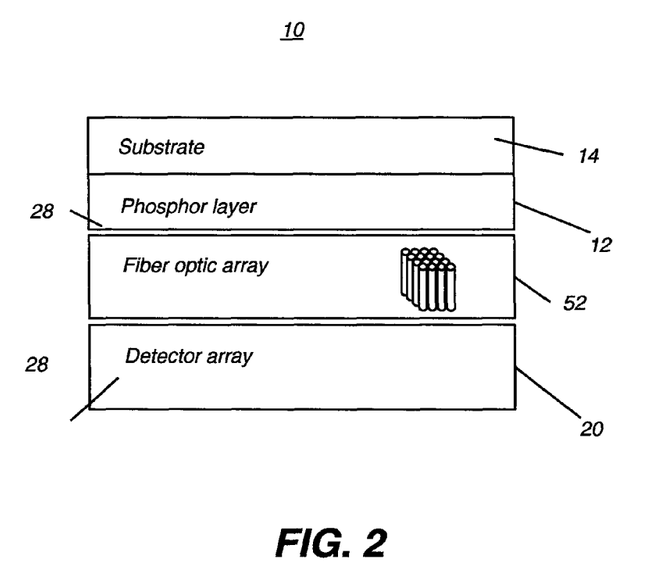
FIG. 2 is a cross-sectional view of a conventional detector device, showing the arrangement of adhesively affixed layers.

The cross-sectional side view of FIG. 2 shows the layered arrangement of conventional digital detector 10 and shows where adhesive is commonly used. Phosphor layer 12 typically is provided on a substrate 14 and is optionally affixed to a fiber optic array 52, which is, in turn, affixed and optically coupled to detector array 20. An adhesive layer 28 is provided between detector array 20 and fiber optic array 52 and between fiber optic array 52 and phosphor layer 12. In conventional practice, substrate 14 may also support additional components as shown subsequently, including a carbon-pigmented black layer for absorbing leakage light and a pigmented white layer for reflecting some portion of the scattered light back through phosphor layer 12.

Among methods employed for improving optical coupling between the scintillator screen and the detector are the following, represented schematically in FIGS. 3A through 3F:

(i) Applying continuous pressure between the phosphor layer and the detector array, thereby maintaining physical contact between these assemblies. This type of solution, shown by arrows in FIG. 3A, can be difficult to maintain across the full surface of the detector. Moreover, it is difficult to make a digital radiography sensor as thin as necessary if mechanical clamping or hold-down devices are employed in order to maintain optical contact between the phosphor layer and photosensor array. Uniformity of optical contact is a must. Where an air gap occurs, the light transmission and the spatial resolution (MTF) would be significantly degraded.

Figure 3A:
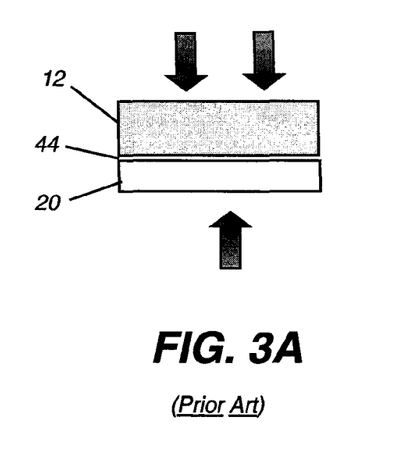
FIGS. 3A, 3B, 3C, 3D, 3E, and 3F are schematic cross-sectional views that illustrate various methods that have been attempted for improving optical coupling between the phosphor layer and the photosensor array in a digital radiography sensor.
Figure 3B:
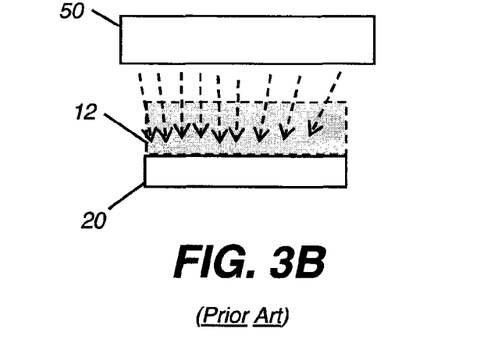

(ii) Depositing the phosphor material directly onto the photodiode array of detector array 20. FIG. 3B shows a deposition apparatus 50 for forming scintillator layer 12. This method assures physical contact, hence good optical contact. However, this type of processing can be complex, may risk damage to the photodiode array and can be very expensive. Detector array 20 is an expensive device, making it impractical to use as a "substrate" for deposition or coating of materials. Uniformity of deposition also presents an obstacle that makes this type of solution less than desirable.

Figure 3C:
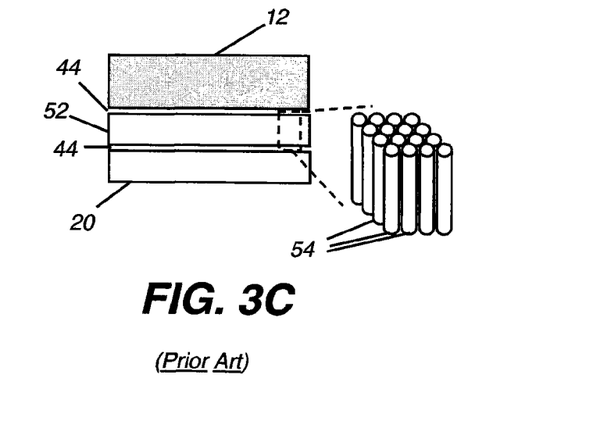

(iii) Use of a fiber-optic array 52, also termed a fiber optic plate or tile, between detector array 20 and phosphor layer 12, as shown in FIG. 3C. Array 52 is an optical device consisting of several thousands of glass optical fibers 54, each a few micrometers in diameter, bonded in parallel to one other. Each optical fiber acts as a light guide. Light from the radiation image is transmitted from phosphor layer 12 to the photodiode array of detector array 20 through each fiber 54. A typical fiber optic array is about 3 mm thick. Phosphor layer 12 is disposed on one surface of fiber optic array 52, then the other surface of fiber optic array 52 is pressed against detector array 20. The fiber optic array provides high-resolution imaging and, with some types of Complementary Metal-Oxide Semiconductor (CMOS) and Charge-Coupled Device (CCD)

photosensor devices, can be useful for providing a measure of protection of the photosensors from high radiation levels. However, this is at the cost of considerable light loss (about 37%). Fiber optic array transmittance is about 63% for Lambertian light at the wavelength of 0.55 um. In addition, air gaps 44 can still occur on either surface of fiber optic array 52. This solution, therefore, also encounters the problems described in (i) and shown in FIG. 3A.

Figure 3D:
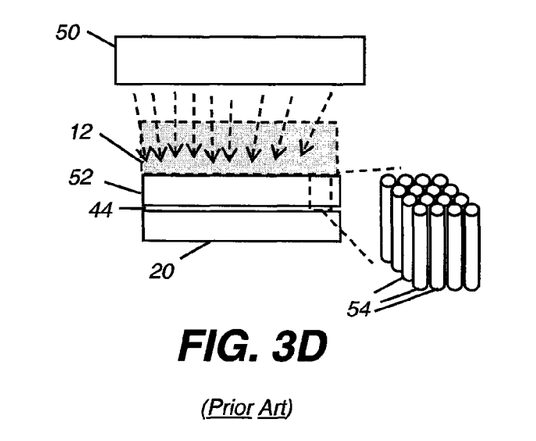

(iv) Depositing a phosphor layer directly onto the fiber-optic faceplate. FIG. 3D shows this hybrid solution. This solution reduces or eliminates air gaps 44 between phosphor layer 12 and fiber optic array 52; however, there can still be an air gap problem at the other surface of fiber optic array 52. This solution also suffers from lowered transmittance as at (iii).

Figure 3E:
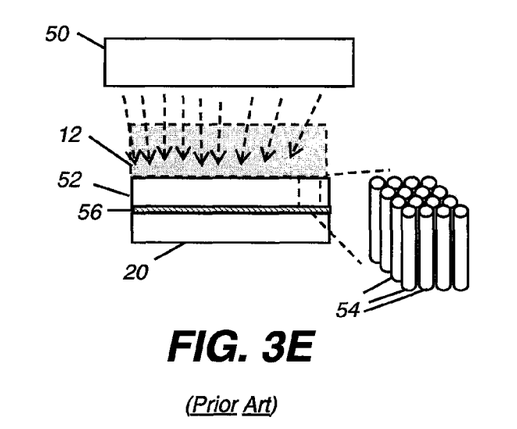

(v) As in FIG. 3E, depositing a phosphor layer directly onto the fiber-optic faceplate as in (iv) and applying an optical adhesive 56 between the coated fiber optic array 52 and detector array 20. As with methods (iii) and (iv) just given, this method suffers from the inherently lower transmittance caused by the fiber-optic faceplate, fiber optic array 52.

Figure 3F:
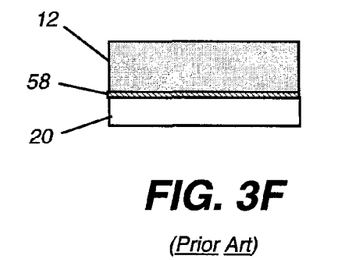

(vi) As in FIG. 3F, insertion of a conventional optically transparent polymer layer 58 between phosphor layer 12 and detector array 20. The optical polymer materials used for this purpose may be in the form of fluid, gel, thermoplastic material, or glue. Each of these optical polymers has accompanying problems. Optical fluids are the most convenient to apply. However, as true fluids, they require containment or will otherwise tend to flow out from the optical interface if unsealed. Optical gels are non-migrating and do not require containment seals. However, they are too soft to provide dimensional rigidity, and may swell with prolonged exposure or at elevated temperatures. Optical thermoplastics (such as elastomers and resins) include soft plastics that, when cured, provide some dimensional rigidity. However, an additional thermal or radiation process for curing is generally required; such processing can be risky for electronic components of detector array 20. Optical glues exhibit similar problems as optical gels. It is also difficult to apply a uniform thickness of glue between the phosphor layer and the detector array. One solution for this problem, proposed in U.S. Pat. No. 5,506,409 to Yoshida et al. entitled "Radiation Detecting Device and the Manufacture Thereof", is the use of spherical spacers to ensure the proper adhesive thickness. However, this requires a number of added steps for proper adhesion, with some complexity and risk of irregular spacer distribution.

Another method of constructing a digital radiography detector is to affix the phosphor layer directly to the fiber optic element or photosensor. In this case, there is an intervening layer of adhesive between the phosphor layer and the fiber optic array or photosensor. The phosphor may thus be optically coupled to the fiber optic element or to the photosensor, therefore reducing the amount of light that is reflected and refracted at the screen surface. This method is proposed, for example, in commonly assigned U.S. patent application Ser. No. 12/104,780 entitled DIGITAL RADIOGRAPHY PANEL WITH PRESSURE-SENSITIVE ADHESIVE FOR OPTICAL COUPLING BETWEEN SCINTILLATOR SCREEN AND DETECTOR AND METHOD OF MANUFACTURE by Yip, published as US 2009/0261259. To reduce the likelihood of losses due to reflection, the Yip disclosure proposes using an intermediary pressure-sensitive adhesive material between the phosphor layer and the photosensors and matching the refractive index of the pressure-sensitive material with that of the phosphor layer and that of the photosensor array. This method may provide a measure of improvement for rigid flat panel detectors that have relatively large imaging areas and can be advantageous where no fiber optic array is used. However, this method is not suited to the requirements of an image detector for dental imaging, where a low profile detector is most advantaged and where high image sharpness is a requirement. Use of intermediary materials in the light path can also be a disadvantage for applications in which more flexible detector materials are more desirable. Moreover, even where the index of refraction is closely matched to materials at the interface, any intervening adhesive layer increases the phosphor layer-to-detector distance over which the light tends to spread. Thus, sharpness degradation can still occur with this solution.

Thus, it is seen that there is a need for a digital radiographic detector that is suited for intra-oral imaging and that provides optical coupling between the photosensor array and the phosphor layer.

SUMMARY OF THE INVENTION

It is an object of the present invention to advance the art of digital radiography. With this object in mind, the present invention provides a digital radiographic detector comprising: (a) a scintillator element comprising a particulate phosphor dispersed within a binder composition, wherein the binder composition comprises a pressure-sensitive adhesive, wherein the particulate phosphor emits light corresponding to a level of incident radiation; and (b) an array of photosensors wherein each photosensor in the array is energizable to provide an output signal indicative of the level of emitted light that is received; wherein the scintillator element bonds directly to, and in optical contact with, either the array of photosensors or an array of optical fibers that guide light to the array of photosensors.

It is a feature of the present invention that it employs a particulate phosphor material that is embedded or suspended within a layer of pressure sensitive adhesive, and is thus able to provide optical contact between the scintillator element of the digital radiography detector and its fiber optic array or, where the fiber optic array is not used, its photosensor.

An advantage of the present invention is that it provides improved optical coupling between light emissive and light-sensing components and eliminates the need for a separately applied adhesive layer.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of the preferred embodiments of the invention, reference being made to the drawings in which the same reference numerals identify the same elements of structure in each of the several figures.

In the context of the present invention, the term "optical contact" has its conventional meaning as understood by those skilled in the optical arts. Optical contact between two surfaces along a light path is considered to be "airtight" physical and optical contact between the two surfaces. In conventional, glueless optical contact, two surfaces are in intimate physical contact without an intervening cement or adhesive.

In the context of the present invention, the terms "scintillator", "scintillator layer", "scintillator element", and "phosphor layer" are interchangeable, each referring to the component of a digital radiography detector that, upon receipt of a given level of radiation, emits a corresponding level of visible light that is received by a photosensor array and is used to form digital image data.

The apparatus and method of the present invention provide an improved digital radiography detector by eliminating the intervening adhesive layer that bonds the phosphor layer either to a fiber optic array or directly to the detector array. Using the method of the present invention, the phosphor layer bonds to its adjacent surface directly to provide optical contact and reduce scattering or spreading of light and thus reduce consequent cross-talk between pixels.

For use in dental imaging and related applications, relatively high resolution imaging is needed. To achieve this, relatively thin layers of phosphor material are used and good optical coupling with each detector is necessary. A fiber optic array element is generally used, since this device is beneficial for reducing the likelihood of radiation damage to photosensor circuitry.

Figure 4:
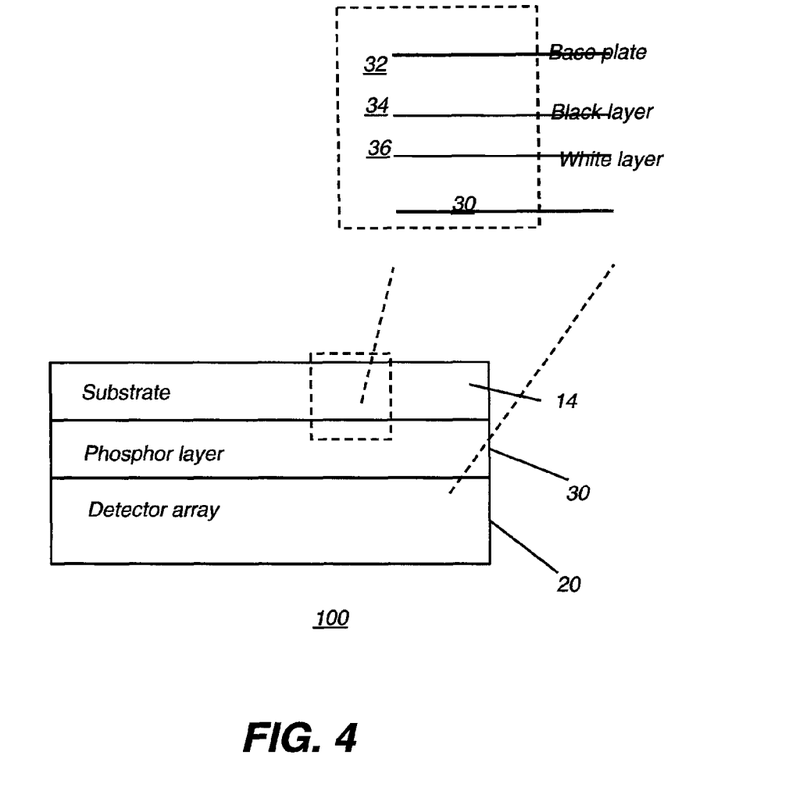
FIG. 4 is a cross-sectional view of a digital detector device with bonded phosphor layer according to one embodiment.

As a scintillator element, embodiments of the present invention use a phosphor layer that is formulated to adhere directly to the photosensor array or, optionally, to the fiber optic array, without the need for an intervening adhesive layer, as was described earlier with reference to FIG. 2. Referring to FIG. 4, a digital radiography detector 100 has a phosphor layer or scintillator element 30 that bonds directly to detector array 20 and is in optical contact with the photosensors in detector array 20.

FIG. 4 also shows exemplary support layers that can be considered as part of substrate 14 in various embodiments of the present invention. A base plate 32 provides a supporting surface for a carbon-pigmented black layer 34 for absorbing light leakage and reducing scattering effects. Black layer 34 is overlaid onto a pigmented white layer 36. White layer 36 reflects some portion of the scattered light back through scintillator element 30. In the alternate embodiment of FIG. 5, scintillator element 30 bonds directly to fiber optic array 52 and is in optical contact with the surface of the fiber optic array 52.

Figure 5:
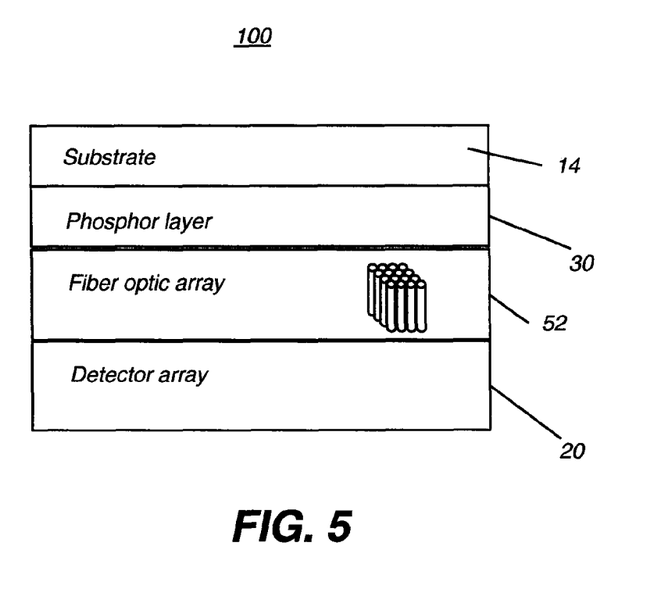
FIG. 5 is a cross-sectional view of a digital detector device with its phosphor layer bonded to a fiber optic array according to an alternate embodiment.

Scintillator element 30 comprises a particulate phosphor dispersed in an adhesive. The phosphor itself is gadolinium oxide phosphor GOS:Tb in one embodiment. In general, the phosphor that is used can be any particulate substance that converts x-rays of the energy appropriate to the imaging task to visible light of an energy appropriate for sensing by the photosensors of detector array 20 and, optionally, for transmission to detector array 20 by the fiber optic elements. Scintillator 30 can have a supporting substrate 14 that serves as an optional carrier or backing layer, as shown in FIGS. 4 and 5.

Scintillator element 30 may be formed by preparing a dispersion of phosphor particles, adhesive and solvent, applying this dispersion in a layer of uniform thickness to the carrier layer of substrate 14 by any appropriate coating method, and drying the applied dispersion. A temporary protective film may be applied to the surface of the phosphor layer after it is formed onto substrate 14, in order to keep it free from contamination. This temporary film is then removed before adhering scintillator element 30 to the photosensor array.

COMPARATIVE EXAMPLES

Figure 6:
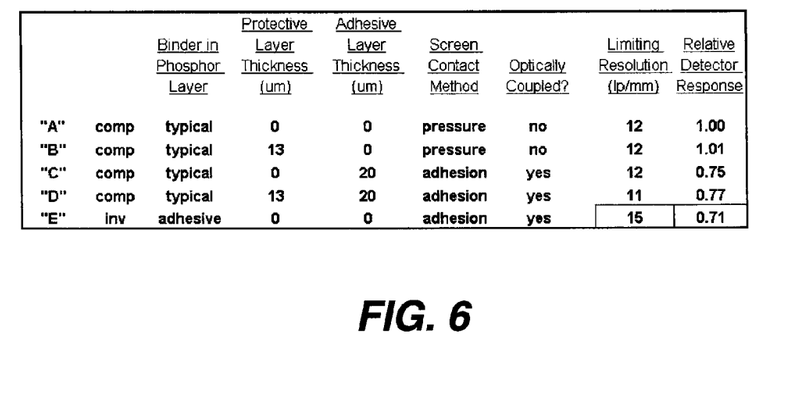
FIG. 6 is a table comparing formulations of conventional detectors to a detector formed according to the present invention.

The table in FIG. 6 shows formulation and results for a number of different DR detector embodiments, comparing conventional phosphor: binder compositions (examples A, B, C, and D) with the formulation used in an embodiment of the present invention (example E).

Phosphor layers for the examples were prepared as follows. Examples A through D were prepared by dispersing GOS:Tb phosphor particles in a typical polyurethane binder at conventional binder: particulate proportions, typically about 27:1. This mixture was coated by knife blade onto a carrier film at a coating weight of 3.2 g/dm2. Additionally, a protective layer of 13 um thickness (nominal) was coated over the phosphor layer for Examples B and D. For Examples A and B, pressure was applied to maintain contact between the phosphor layer and photodetector array; however, optical contact was not achieved. For Examples C and D, an adhesive was applied between the phosphor sheet and the fiber optic array for directing light to the photodetector array. Relatively good optical coupling was achieved by this method, but not optical contact, as has been defined earlier.

Example E was prepared according to the present invention, using a pressure-sensitive adhesive directly as the binder, in a binder: particulate proportion of 9:1 (nominal). The phosphor layer of Example E was bonded to a fiber optic element directly with no adhesive coating prior to bonding. No protective layer was used.

The right-most two columns of the table in FIG. 6 show performance results for each formulation method that was used in these Examples. Limiting resolution, shown in line pairs (lp) per mm indicate that the inventive embodiment of Example E markedly out-performs the more conventional formulations. The inventive embodiment of Example E also shows improved performance with respect to relative detector response, normalized to the performance of the conventional detector of Example A.

Figure 7:
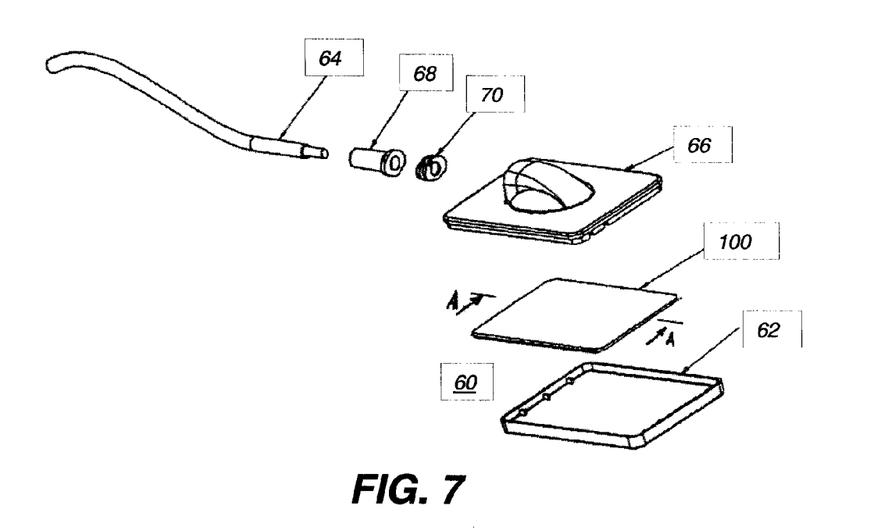
FIG. 7 is a perspective exploded view showing an intra-oral detector using the digital radiography detector of the present invention.
Figure 8:
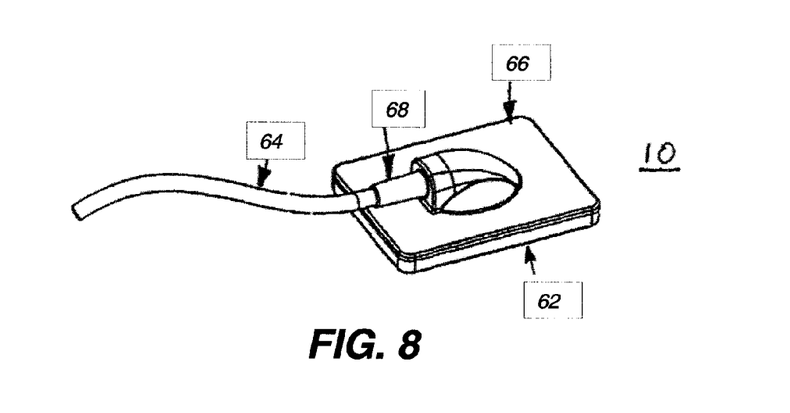
FIG. 8 is a perspective view showing an assembled intra-oral detector using the digital radiography detector of the present invention.

FIGS. 7 and 8 are perspective views of an intra-oral detector 60, in exploded and assembled forms, respectively, using digital radiography detector 100 of the present invention. Digital radiography detector 100 is supported between a lower cover 62 and upper cover 66 that provides connections for obtaining image data from a cable 64. Alternately, a wireless interface (not shown) could be provided. In the wired version shown, cable 64 has a connector 68 and seal 70 for protecting the cabling connections.

Materials and Fabrication

Referring again to FIG. 4, substrate 14 and scintillator element 30 of digital radiography detector 100 can comprise multiple components. The base support material of base plate 32 may be any suitable material that will pass x-rays without diffraction and can be easily cleaned. Typical materials used for this purpose include PET (polyethylene terephthalate) or similar polyester support. A suitable material is a clear polyester of the thickness of about 10 mils or 1/100 of an inch (0.254 millimeters).

Carbon-pigmented black layer 34 is formed of any suitable material that will provide a uniform light-absorbing layer that blocks the passage of light. Generally, the layer is comprised of carbon black and a small amount of polymer for casting and layer forming. In one embodiment, this polymer is cellulose acetate; other suitable polymers can be used. White layer 36 is formed of any suitable material that reflects and enhances the light from the phosphor. Preferably, white layer 36 includes a titanium dioxide, $TiO_2$, pigment, cast with a polymer such as cellulose acetate. Also suitable would be a film containing titanium dioxide, possibly with micropores, such as commercially available titanium dioxide-containing polypropylene film that has been stretched to form micropores around the titanium dioxide particles.

The phosphor layer used for the scintillator in embodiments of the present invention includes phosphor particles formed into a layer with a binder of adhesive material selected from the known phosphor materials that emit light in response to incident x-rays. Suitable phosphor materials include Lutetium oxysulfide and Gadolinium oxysulfide ($Gd_2O_2S$), for example. Preferred materials include terbium and gadolinium oxide phosphors, including $Gd_2S_2O:Tb$ which is advantaged due to its ready availability and cost.

The term "binder", as utilized herein, means the material in phosphor layer of scintillator element 30 that is not phosphor itself. The proper amount of binder is needed. Too much of this adhesive material causes blocking of the coated layers when wound or stacked, while too little reduces the pressure sensitive adhesive sealing properties which can result in the phosphor layer peeling away from the surface to which it is affixed. The binder encapsulates the phosphor particles and provides a suitable bond to detector array 20 (FIG. 4) or, optionally, to fiber optic array 52 (FIG. 5). The binder must meet these requirements:

(i) Pressure-sensitive, capable of sealing with applied heat and pressure, but not tacky to the touch at room temperature and not blocking when wound or stacked;

(ii) Optically clear and colorless;

(iii) Not sensitizing to the phosphor particles.

(iv) At least moderately viscous for coating application; and (v) Low glass transition temperature, near about −38° F.

The binder for the phosphor layer may be a polyester or polyether. The binder composition preferably contains solids of about 38 to 46 parts of acrylic adhesive latex, based upon 100 total parts, in solvents well-known for use with adhesives and latexes.

A preferred binder for the invention includes a non-crosslinked acrylic polymer adhesive that, upon evaporation of its solvent, forms a matrix material around and between the phosphor particles. One exemplary acrylic adhesive with suitable properties is Morstik, available from Rohm&Haas/Dow Chemical, Inc. This layer of phosphor particles and the non-crossed linked adhesive is then activated to form a permanent bond under moderate heat and sealing pressure.

Scintillator element 30 is cast from a mixture of binder provided with a solvent material to enable casting. Solvents for casting the phosphor layer may include ethyl acetate, methyl acetate, acetone, and isopropyl alcohol. The solvent is evaporated to form the layer. Generally, to provide a nominal 9:1 particulate to binder ratio, scintillator element 30 contains between 85 and 95% by weight of phosphor. Binder, including any filler, is between 5 and 15% by weight, after drying. A preferred amount is between about 8 and 12% by weight of the binder, as this gives good binding properties to the layer as well as a high amount of phosphor for improved imaging.

The formulation and assembly of a fiber optic faceplate for fiber optic array 52 is known to those skilled in the optical component fabrication arts. Preferably the fiber optic faceplate has a thickness of about an eighth of an inch (approximately 2 millimeters). Fiber diameter is generally about 6 um.

The composition of the photosensor array that is in contact with the fiber optic element is known. The types of optical sensors that are energizable to provide an output signal in response to received light are composed of a plurality of sensor sites or photosites, arranged in a matrix. The sensors themselves can be Charged-Coupled Devices (CCD) or Complimentary Metal-Oxide Semiconductor (CMOS) detectors, or some other type of photosensing device, for example. Some type of protective covering for this underlying circuitry is typically provided.

In one embodiment, digital radiography detector 100 is fabricated by bonding scintillator element 30 directly to fiber optic array 52 or to detector array 20, using heat and pressure for glueless optical contact. To minimize air pockets or voids, this process is preferably carried out under vacuum.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. DR detector
12. Phosphor layer
14. Substrate
20. Detector array
22. Photosensor
24. Pixel
25. Readout elements
26. Switch element
28. Adhesive layer
30. Scintillator element
32. Base plate
34. Black layer
36. White layer
44. Air gap
50. Deposition apparatus
52. Fiber-optic array
54. Optical fiber
56. Optical adhesive
58. Polymer layer
60. Intra-oral detector
62. Lower cover
64. Cable 66. Upper cover
68. Connector
70. Seal
100. Digital radiography detector
E. Enlarged section

What is claimed is:

1. A digital radiographic detector comprising:
a scintillator element comprising a particulate phosphor dispersed within a binder composition, wherein the binder composition comprises a pressure-sensitive adhesive, wherein the particulate phosphor emits light corresponding to a level of incident radiation; and
an array of photosensors wherein each photosensor in the array is energizable to provide an output signal indicative of the level of emitted light that is received;
wherein the scintillator element is configured to be permanently bonded directly to, and in optical contact with, either the array of photosensors or an array of optical fibers that guide light to the array of photosensors using the pressure-sensitive adhesive of the binder composition.

2. The digital radiographic detector of claim 1 wherein the binder comprises an acrylic polymer.

3. The digital radiographic detector of claim 1 wherein the scintillator element further comprises a substrate.

4. The digital radiographic detector of claim 3 wherein the substrate comprises a carbon black-containing layer.

5. The digital radiographic detector of claim 3 wherein the substrate comprises a white reflective layer.

6. The digital radiographic detector of claim 3 wherein the substrate comprises a polyester support.

7. The digital radiographic detector of claim 1 wherein the particulate phosphor is taken from the group consisting of Lutetium oxysulfide, Gadolinium oxysulfide, terbium and gadolinium oxide phosphors, and $Gd_2S_2O$:Tb.

8. The digital radiographic detector of claim 1 wherein the scintillator element is bonded to either the array of photosensors or the array of optical fibers using a combination of heat and pressure.

9. The digital radiographic detector of claim 1 wherein the photosensors are taken from the group consisting of charge-coupled devices and CMOS sensors.

10. A digital radiographic detector comprising:
a scintillator element comprising a particulate phosphor dispersed within a binder composition, wherein the binder composition comprises a pressure-sensitive adhesive, wherein the particulate phosphor emits light corresponding to a level of incident radiation;
an array of photosensors wherein each photosensor in the array provides an output signal indicative of the level of emitted light it receives; and
an array of optical fibers disposed to guide light emitted from the scintillator element toward photosensors in the array of photosensors,
wherein the scintillator element permanently bonds in optical contact to the array of optical fibers.

11. The digital radiographic detector of claim 10 wherein the binder comprises an acrylic polymer.

12. The digital radiographic detector of claim 10 wherein the scintillator element further comprises a substrate.

13. The digital radiographic detector of claim 12 wherein the substrate comprises a carbon black-containing layer.

14. The digital radiographic detector of claim 12 wherein the substrate comprises a white reflective layer.

15. The digital radiographic detector of claim 12 wherein the substrate comprises a polyester support.

16. The digital radiographic detector of claim 10 wherein the particulate phosphor is taken from the group consisting of Lutetium oxysulfide, Gadolinium oxysulfide, terbium and gadolinium oxide phosphors, and $Gd_2S_2O$:Tb.

17. The digital radiographic detector of claim 10 wherein the scintillator element is bonded to either the array of photosensors or the array of optical fibers using a combination of heat and pressure.

18. The digital radiographic detector of claim 10 wherein the photosensors are taken from the group consisting of charge-coupled devices and CMOS sensors.

19. A method for forming a digital radiographic detector, the method comprising:
forming a scintillator element by suspending phosphor particles within a pressure-sensitive binder and applying the suspension onto a base support;
permanently bonding the scintillator element directly to a first surface of an array of optical fibers using the pressure-sensitive binder and without an additional adhesive; and
providing optical contact between a second surface of the array of optical fibers and a photosensor array.

20. The method of claim 19 wherein bonding comprises applying a combination of heat and pressure.

* * * * *